Aug. 30, 1966  R. M. BUCHWALD  3,269,213
VARIABLE RATIO MECHANICAL BRAKE ACTUATING LINKAGE
Filed March 13, 1964  2 Sheets-Sheet 1

INVENTOR.
ROBERT M. BUCHWALD
BY
D. D. McGraw
ATTORNEY

Aug. 30, 1966    R. M. BUCHWALD    3,269,213
VARIABLE RATIO MECHANICAL BRAKE ACTUATING LINKAGE
Filed March 13, 1964
2 Sheets-Sheet 2
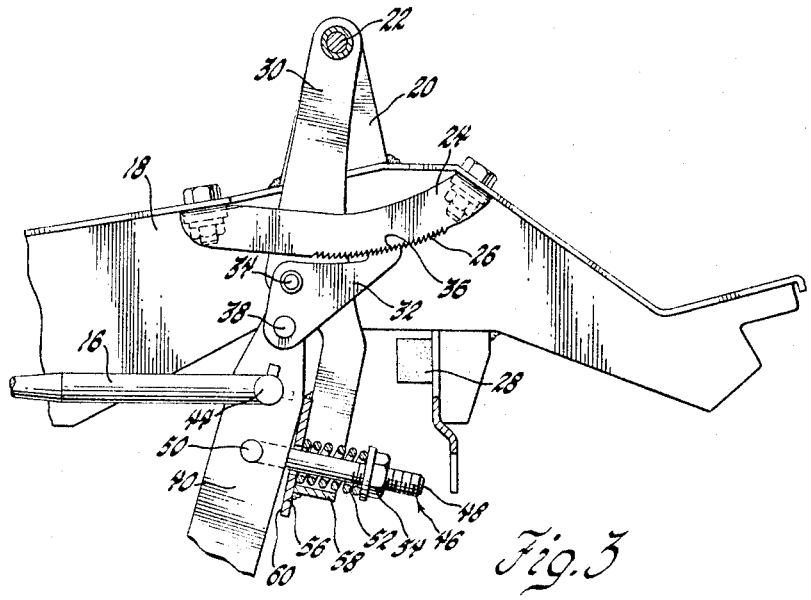
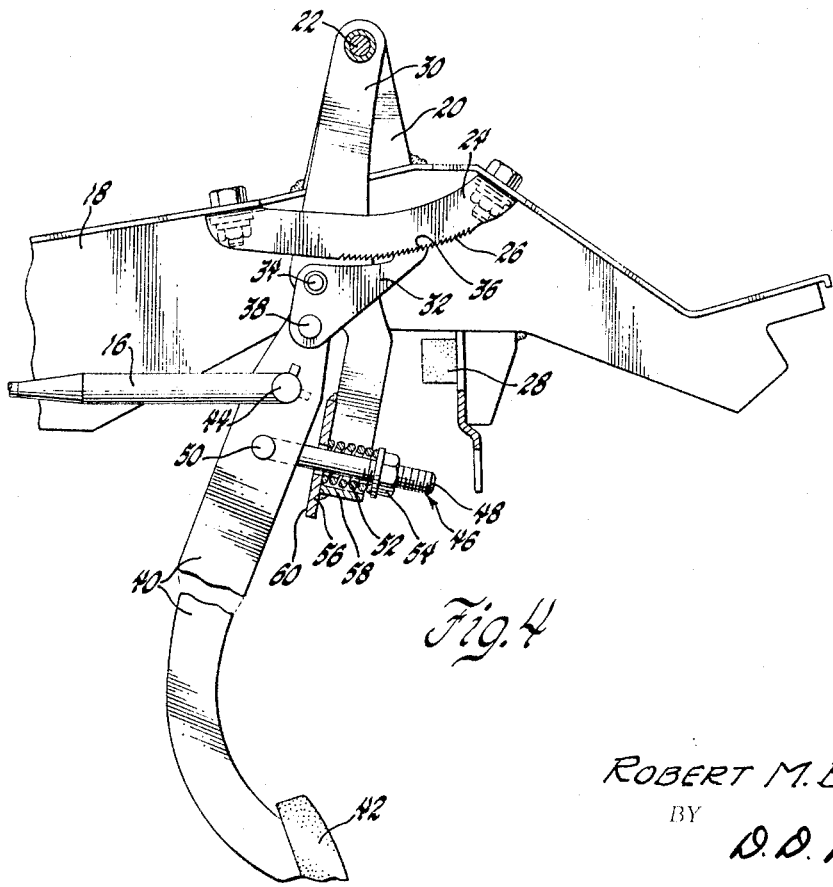
INVENTOR.
ROBERT M. BUCHWALD
BY
D. D. McGraw
ATTORNEY United States Patent Office 3,269,213
Patented August 30, 1966

3,269,213
VARIABLE RATIO MECHANICAL BRAKE
ACTUATING LINKAGE
Robert M. Buchwald, Berkley, Mich., assignor to General Motors Corporation, Detroit, Mich., a corporation of Delaware
Filed Aug. 13, 1964, Ser. No. 389,245
6 Claims. (Cl. 74—516)

This invention relates to variable ratio lever mechanisms and more particularly to a force multiplying lever mechanism for the operation of vehicle brakes.

It is desirable in the construction of foot pedals for vehicle brake operation to have a mechanism which multiplies the force exerted on the brake pedal. It is also desirable to have a lower mechanical advantage for brake operation during the period of operation in which the brake system is being pressurized and the brake shoes are being seated against the drum. Normally a force multiplication of a lever mechanism involves a force distance relationship in which the greater the mechanical advantage of the system the greater the pedal travel required to accomplish the added advantage. It becomes apparent, therefore, that during the initial portion of brake pedal movement while the system is being initially pressurized and the brake shoes seated against the drum that a lesser mechanical advantage is required than during the period of operation when the brake shoes are being forced into frictional engagement with a rotatable drum.

It is an object of the present invention to provide an improved brake actuating lever mechanism which provides a certain predetermined mechanical advantage during an initial portion of the brake actuation and provides a higher mechanical advantage for operation of the braking system when a braking action is actually taking place.

It is another object of the present invention to provide an improved ratio changing lever mechanism for the operation of vehicle brakes which automatically compensates for brake wear.

It is still another object of the present invention to provide an improved ratio changing lever mechanism for the operation of vehicle brakes which provides a lesser mechanical advantage for the initial pressurization of the system and the seating of the brake shoes against the rotatable drum and then automatically senses the need for an increased mechanical advantage for the actual vehicle braking.

It is a further object of the present invention to provide an improved ratio changing mechanism for the actuation of vehicle brakes which is inexpensive to manufacture and is compatible with the design of vehicle brakes in general use.

It is yet a further object of the present invention to provide an improved ratio changing mechanism for vehicle brake pedal operation which is adjustable so as to be adaptable for use with braking systems having different force requirements for seating the brake shoes against the rotatable drum.

Further objects and advantages of the present invention will be apparent from the following description, reference being had to the accompanying drawings wherein a preferred embodiment of the present invention is clearly shown.

In the drawings:

FIGURE 3 shows the mechanism of FIGURE 1 in a further actuated condition.

FIGURE 4 shows the mechanism of FIGURE 1 in the fully actuated condition.

Figure 1:
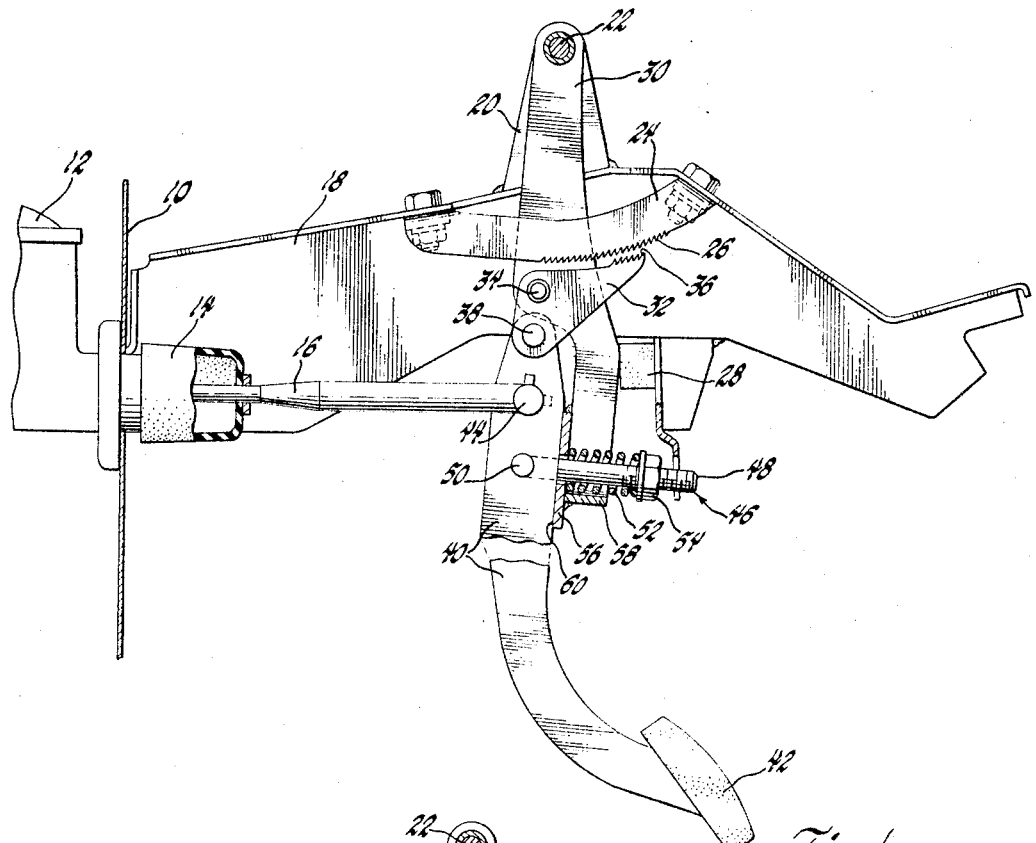
FIGURE 1 is an elevation view, with parts broken away and in section, of a brake lever mechanism embodying the invention, with mechanism being in the released position.

The mechanism embodying the invention is illustrated as being a part of a brake system for a vehicle. The vehicle is typically provided with a firewall 10 and a master cylinder assembly 12 secured to the firewall in the engine compartment and extending rearwardly through the firewall into the vehicle operator compartment. The master cylinder assembly includes a boot 14 through which extends a push rod 16. The forward end of the push rod is connected in any suitable manner to the pressurizing member contained in the master cylinder. A bracket 18 is suitably fixed to the vehicle for mounting the brake pedal mechanism. Bracket 18 has a pedal mounting section 20 providing a mounting for a pivot 22. A ratchet or rack 24 is secured to bracket 18 and is provided with teeth 26. A pedal mechanism bumper or stop 28 is appropriately mounted on bracket 18.

A pendant lever or arm 30 is pivotally attached to the mounting section 20 by means of the pivot 22. Lever 30 extends past ratchet 24 so that it normally is movable along a side surface of the ratchet. A pawl 32 is pivotally mounted by pivot 34 on lever 30 and is provided with one or more teeth 36. Pawl 32 is so positioned on lever 30 relative to rack 24 as to permit engagement and disengagement of teeth 36 with teeth 26 upon pivotal movement of the pawl about pivot 34. Another pivot 38 is provided on pawl 32 by which the pedal arm or lever 40 is pivotally attached to the pawl. Arm 40 is also positioned in a pendant relation in such a manner that the pedal 42 on the lower end of arm 40 is in position to be actuated by the foot of the vehicle operator. The master cylinder push rod 16 is pivotally attached to arm 40 at pivot 44. A variable ratio control mechanism 46 is provided and includes a rod 48 pivotally attached by pivot 50 to pedal arm 40. Mechanism 46 also includes a compression spring 52 and a spring retainer 54. Spring 52 encircles rod 48 and has one end seating on a spring seat 56 formed on the lower end of lever 30. This end of lever 30 may also be formed to provide a spring guide 58. Spring retainer 54 is preferably a threaded member which is screwed onto threads formed on the rear end of rod 48. The spring seat 56 is provided with a flat surface 60 against which a flat side of pedal arm 40 is normally in surface engagement when the mechanism is in the released position. Arm 40 is urged to this position by spring 52, which is under a preset compression load determined by the spring characteristics and the position of the spring retainer 54 on rod 48.

In the released position illustrated in FIGURE 1, pivots 22, 34, 38, 44 and 50 are substantially in line, although exact alignment is not necessary.

Figure 2:
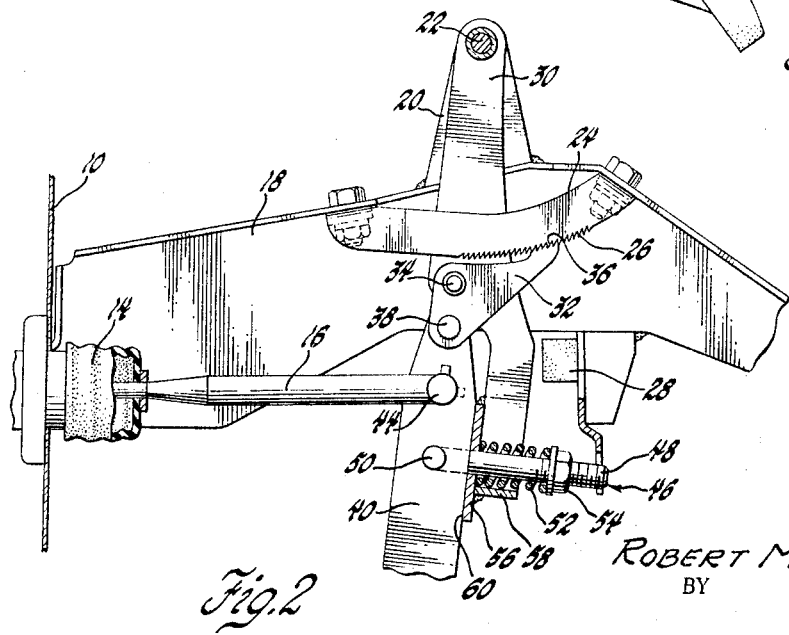
FIGURE 2 is similar to FIGURE 1 and shows the mechanism in a partially actuated condition.

FIGURES 2, 3 and 4 illustrate the ratio changing mechanism in progressive stages of actuation and it is noted therein that the alignment previously described no longer exists. The alignment described herein is intended only to provide a visual indication in the drawings of the progressive stages of actuation and it is not essential to the operation of the device.

In operation, a pressure is exerted on the pedal 42 tending to drive the lever 40 in the general direction of the master cylinder assembly 12. An examination of FIGURE 1 indicates that the lever or arm 30, during initial portions of the pivotal movement of the lever 40, acts in unison with the lever 40 due to its biased engagement with the lever by the variable ratio control mechanism 46. During this period of time, the lever 40 pivots about the pivot 22. The push rod 16 is driven into the master cylinder assembly 12 and the braking system will be increasingly pressurized as the push rod 16 penetrates further through the boot 14 illustrated in FIGURE 1. It is evident that as long as sufficient back pressure does not exist from the braking system against the push rod 16 that the spring 52 will maintain the lever 40 and the lever 30 in engagement. As the pivotal movement of the levers 40 and 30 around the pivot point 22 continues and the push rod 16 exerts sufficient pressure on the master cylinder to overcome the pressure of the return springs in the conventional brake system, the brake shoes therein will be driven into engagement with the rotatable drum in a conventional manner. Thereafter, back pressure against the push rod 16 will increase until the pivoting lever 40 will overcome the compression of the spring 52 and the levers 40 and 30 will come out of engagement with one another.

As the compression of the spring 52 is overcome, the lever 40 will pivot about the pivot 44 which will cause the pivot 38 to move in a clockwise manner about the pivot 44. Consequently, the pivot 38 will move in a counter-clockwise fashion about the pivot 34 and the pawl 32 carrying the teeth 36 will be driven into engagement with the teeth 26 on the ratchet or rack 24. As contact therebetween is made, further pivotal movement of the pawl 32 is prevented and the lever 40 will thereafter pivot about the relatively fixed pivot 38.

It is evident that the lever arm established between the pivot 44 and the pivot 22 is substantially greater than the distance between the pivot 44 and the new operative pivot 38. Therefore, an increased mechanical advantage for further movement of the push rod 16 is possible when the new operative pivot 38 is used. This greater mechanical advantage will assist in the frictional engagement of the brake shoes with the rotatable drum and provides an assist to a vehicle operator putting pressure on the pedal 42 in the actuation of the brakes.

In the system described herein, the mechanical advantage available while the lever 40 and lever 30 are operating in unison about the pivot 22 to drive the push rod 16 into the master cylinder is approximately 2.7. As increasing force is applied to the pedal, the mechanical advantage increases to a 5.4 ratio described toward the theoretical maximum of approximately 10.1. It is evident that changing the dimensions of the levers and the distance between the pivot would vary the mechanical advantage and one skilled in the art utilizing the inventive concept presented herein would provide a series of ratios applicable to a particularly designed system while remaining within the inventive concept described herein.

As pressure is released from the pedal 42, back pressure in the system will drive the push rod 16 toward the lever 40 and the force of the compressed spring 52 will take over and pivot the lever 40 generally counter-clockwise about the pivot 38. Thereafter, the lever 30 and the lever 40 operate in unison and the return movement of the pedal 42 is about the pivot 22.

FIGURE 2 illustrates the subject invention in a position it would assume when the push rod 16 has been driven in the master cylinder 12 to a point where the back pressure from the braking system against the push rod 16 has not exceeded the compression force of the spring 52 holding the levers 30 and 40 together.

Referring now to FIGURE 3, the lever 40 is illustrated as pivoting about the pivot 38 and the pawl 32 carrying the teeth 36 having been driven into engagement with the rack 24 carrying the teeth 26.

FIGURE 4 illustrates the teeth 26 and 36 in engagement and the lever 40 in a pivotal movement around the pivot 38. It will be noted that the lever 40 has pivoted away from the lever 30 and the spring 52 is compressed against the spring seat 56. In this position, the lever 30 is relatively fixed with respect to the pivoting lever 40 due to the engagement of the teeth 36 with the teeth 26. It is understood that the exact position on the rack 24 that the pawl 32 engages the rack 24 is determined by the force of the return springs in the wheel brakes as well as the amount of fluid displacement necessary to overcome the force of the return springs. This distance would be determined by the level of the hydraulic fluid in the braking system as well as by the amount of wear experienced previously on the brake shoes. It is obvious that as wear on the brake shoes increases and if no mechanical automatic adjustment has taken place, the point of engagement of the pawl 42 with the rack 24 will be further along the arcuately shaped rack 24.

The utility of the present invention is obvious in an environment where its acts as a brake pedal actuator for vehicle brakes. The principal advantage of the system is that, the lost motion or the movement of the component in the brake system that positions the frictional elements carried by the brake shoe into engagement with the brake drum that accomplishes no braking action, is brought about at a lower mechanical advantage with a consequent lesser pivotal movement of the pedal 42. When an actual braking action is occurring, the pedal movement increases slightly in order to gain the benefits of the increased mechanical advantage made possible by the repositioning of the pivots as hereinbefore described. It is obvious that if the subject invention were utilized in a system having a different reactive force put on the push rod 16 by the return springs in the brake system that the system described herein is easily adjusted to compensate for the added or lessened back pressure by movement of the retainer 54 on the rod 48. Therefore, a greater preload can be built into the control mechanism 46 to compensate for differences in system designs.

While the embodiment of the present invention as herein disclosed constitutes a preferred form, it is to be understood that other forms might be adopted.

What is claimed is as follows:

1. A variable ratio lever mechanism comprising, a fixed member having a first pivot, a first lever pivotally attached to said fixed member by said first pivot and having a second pivot, a second lever pivotally attached to said first lever by said second pivot and having a third pivot, a third lever pivotally attached to said second lever by said third pivot, a fourth pivot on one of said levers, an output member pivotally attached to said one lever by said fourth pivot, ratio control means interconnecting said one lever and another one of said levers, and means on yet another one of said levers selectively engageable with said fixed member and fixing two of said levers against pivoted movement whereby said one lever is pivotable thereon to move said output member at a different ratio.

2. Lever mechanism for varying the rate of output of the mechanism relative to the input, said mechanism comprising: input means adapted to be pivoted at least at one pivot; output means pivotally engaging said input means; lever means pivotally attached to a relatively fixed member; linking means pivotally engaging said input means and said lever means and including means for maintaining said lever means fixed with respect to said input means during one condition of operation and thereafter changing the effective pivot point of the input means in a manner creating a greater mechanical advantage for subsequent operation, said linking means including biasing means for resiliently holding said lever means and said input means in resilient engagement during pivotal movement of said input means between two extremes of movement.

3. Lever mechanism for varying the rate of output of the mechanism relative to the input, said mechanism comprising: a fixed bracket; first lever means pivotally supported by said fixed bracket and including control means; ratchet means having a first portion pivotally carried by said first lever means, and a second portion carried by the fixed bracket; input means pivotally supported by the ratchet means and pivotally engaging the control means; and output means pivotally engaging said input means at a point between the pivotal engagement of the control means and the ratchet means, said input means adapted to be pivoted by a force exerted thereon in a manner wherein the first lever means is made an effective extension of the input means by the cooperation of the control means during a portion of the pivotal movement, said input means adapted to be pivoted at a point offering a better mechanical advantage relative to the output means when output resistance overcomes the control means and the ratchet means induces pivotal movement in the input means relative to the first lever means.

4. Lever mechanism for varying the mechanical advantage between an input member and an output member, said lever mechanism comprising: a fixed bracket carrying first pivot means thereon; first lever means pivotally carried on the fixed bracket by the first pivot means and including control means cooperating therewith; a toothed sector carried by the fixed bracket; second lever means including a toothed portion engageable with the toothed sector and including second pivot means engaging said first lever means and third pivot means; and third lever means pivotally carried by the third pivot means and pivotally engaging the control means and an output member at a point between the third pivot means and the pivotal engagement with the control means, said third lever means and said first lever means adapted to operate in unison during an initial pivoting movement of the third lever means around the first pivot means thereby establishing a first predetermined mechanical advantage between the third lever means and an output member, said third lever means adapted to overcome the control means during a further pivotal movement thereby pivoting the second lever means and the second pivot means into tooth engaging relationship with the toothed sector causing the third lever means to pivot on the third pivot means allowing a second greater mechanical advantage relationship between the third lever means and the output member greater than the first predetermined mechanical advantage to exist for further pivotal movement of the third lever means.

5. The lever mechanism according to claim 4 wherein the third lever means is a brake pedal for vehicle brakes and the output member is a push rod adapted to engage hydraulic system pressure inducing means.

6. The lever mechanism according to claim 4 wherein the control means comprises: a pin pivotable on the third lever means; a spring circumferentially mounted on said pin; and an adjusting means arranged to hold one end of the spring in biased engagement with the first lever means and the other end fixed with respect to the third lever means thereby providing a biased and variable connection between the first and third lever means.

References Cited by the Examiner

UNITED STATES PATENTS 2,977,817 4/1961 Panasewicz _____ 74—516
3,217,558 11/1965 Schroter _____ 74—516

FOREIGN PATENTS

Ad. 72,650 11/1959 France.

MILTON KAUFMAN, *Primary Examiner.*